Patented May 22, 1945

2,376,782

UNITED STATES PATENT OFFICE 2,376,782

RUBBERLIKE COMPOSITIONS

Lowell B. Kilgore, Arlington, Va., assignor to Kilgore Development Corporation, a corporation of Virginia No Drawing. Application April 2, 1942, Serial No. 437,425

24 Claims. (Cl. 260—36)

This invention concerns softening synthetic elastomers and relates also to compositions of such elastomers with certain so-called tackifying agents.

Generally speaking such synthetic elastomers having commercial qualities are harder than natural rubber. They are therefore, more difficult to mill or to incorporate with compounding agents. Furthermore, such hard synthetic products are less cohesive than natural rubber and so abrade more easily. They are also less adherent to ply materials or to fillers; or in general possess less bonding power than rubber compositions.

Although agents can be added to soften these synthetic products such softeners heretofore have sharply diminished the tensile strength of the finished product. Since the tensile strength of rubber-like compositions is such an important property, it is important to obtain suitable tackifying or softening agents which do not adversely affect it.

A purpose involved in this invention is to soften synthetic elastomers, but preferably to soften without diminishing the tensile strength. A special object is to soften these elastomers and yet to increase the tensile strength. A further object is to impart softness consistently with high tensile strength and yet consistently with properties imparted by other compounding agents. For example, it is important to produce a soft and strong or resilient synthetic elastomer composition, but yet to obtain the benefits of vulcanizing or accelerating or preserving agents of various sorts, where such are used. Another purpose is to compound synthetic elastomers with a softening agent, the boiling range of which is high enough to withstand vulcanization without substantial loss.

This invention is applicable to various synthetic elastomers. Such are in general copolymers of butadiene with such compounds as styrene, acrylonitrile, etc. Such products are known commercially, as for example, "Buna-S," "Perbunan," "Ameripol," "Hycar," "Chemigum," etc. Various styrenes or substituted styrenes also are comprised in this invention.

Various advantages of this invention are based on the fact that suitable softening agents for these synthetic elastomers are esters of p-isopropyl benzoic acid. The preferred agents in many respects, but without limitation, are the butyl esters, particularly the normal butyl ester. Various applications of this invention will be apparent from further description of treating "Hycar" with n-butyl ester of p-isopropyl benzoic acid.

The profound effect of softening agent under this invention may be demonstrated by immersing a sample of the elastomer in butyl p-isopropyl benzoate for 24 hours at 100° F. At the end of this period the elastomer had swollen to about twice its original size and had taken up a substantial quantity of the ester. The sample had changed from a dark material and had become substantially transparent.

Similarly, when a sample of "Hycar O R," a copolymer of butadiene and acrylonitrile, was milled with 25 percent of its weight of butyl p-isopropyl benzoate as a softening agent, the resulting compound showed a rise of about 30 percent in tensile strength in addition to the softening effect. This is surprising inasmuch as the sample though becoming stronger and yet of high elasticity had also become softened and indeed somewhat more tacky. Such product conforms well to various mold contours. It exhibits properties of improved cohesion so as to be more readily manufactured with compounding agents, cords, plies and the like as in manufacture of rubber products. Such product containing carbon filler exhibits particularly well these various properties.

This invention may be practiced not only with the butyl ester described, but in general with other esters of p-isopropyl benzoic acid. This acid is known sometimes commercially as cumic acid or as cuminic acid. In general the formula of these suitable softening agents is:

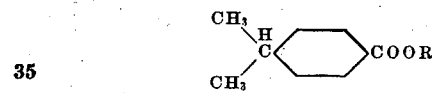

wherein R, the esterifying group, is an alkyl, cycloalkyl, aralkyl, aryl or heterocyclic group. Suitable specific esters of this designation for the purpose of illustration are:

*p-Isopropyl benzoic ester*—"R" *in above general formula*

| | |
|---|---|
| Methyl | —CH₃ |
| Ethyl | —C₂H₅ |
| Isopropyl | —i—C₃H₇ |
| Sec. butyl | —S—C₄H₉ |
| Butyl | —C₄H₉ |
| Isobutyl | —i—C₄H₉ |
| Tert. butyl | —t—C₄H₉ |
| Dodecyl | —C₁₂H₂₅ |
| Phenyl | —C₆H₅ |
| Benzyl | —C₆H₅CH₂ |
| Cyclohexyl | —C₆H₁₁ |
| β′-Butoxy-β-ethoxyethyl | —C₄H₉O C₂H₄O C₂H₄ |
| 2,3,4,C-tetrochlorophenyl | —Cl₄C₆H |

Although this invention has been described with reference to preferred embodiments of this invention in accordance with the patent statutes, it will be evident to those skilled in the art that other specific materials and steps may be applied under this invention within the terms of the appended claims.

What I claim is:

1. A process of softening synthetic elastomers comprising treating elastomeric copolymers of butadiene and styrene with n-butyl ester of p-isopropyl benzoic acid.

2. As a new composition of matter, elastomeric copolymer of butadiene and styrene containing n-butyl ester of p-isopropyl benzoic acid.

3. A process of softening synthetic elastomers comprising treating rubber-like copolymers of butadiene and a vinyl compound selected from the group consisting of styrene and acrylonitrile with alkyl ester of p-isopropyl benzoic acid.

4. As a new composition of matter, rubber-like copolymer of butadiene and a vinyl compound selected from the group consisting of styrene and acrylonitrile containing an alkyl ester of p-isopropyl benzoic acid.

5. A process of softening synthetic elastomers comprising treating elastomeric copolymers of butadiene and acrylonitrile with 2,3,4,6-tetrachlorophenyl ester of p-isopropyl benzoic acid.

6. A process of softening synthetic elastomers comprising treating elastomeric copolymers of butadiene and acrylonitrile with cyclohexyl ester of p-isopropyl benzoic acid.

7. As a new composition of matter, elastomeric copolymer of butadiene and acrylonitrile containing 2,3,4,6-tetrachlorophenyl ester of p-isopropyl benzoic acid.

8. As a new composition of matter, elastomeric copolymer of butadiene and acrylonitrile containing cyclohexyl ester of p-isopropyl benzoic acid.

9. A process of softening synthetic elastomers comprising treating rubber-like copolymers of butadiene and a vinyl compound selected from the group consisting of styrene and acrylonitrile with an ester of p-isopropyl benzoic acid.

10. A process of softening synthetic elastomers comprising treating rubber-like copolymers of butadiene and a vinyl compound selected from the group consisting of styrene and acrylonitrile with a butyl ester of p-isopropyl benzoic acid.

11. A process of softening synthetic elastomers comprising treating rubber-like copolymers of butadiene and a vinyl compound selected from the group consisting of styrene and acrylonitrile with n-butyl ester of p-isopropyl benzoic acid.

12. As a new composition of matter, rubber-like copolymer of butadiene and a vinyl compound selected from the group consisting of styrene and acrylonitrile containing an ester of p-isopropyl benzoic acid.

13. As a new composition of matter, rubber-like copolymer of butadiene and a vinyl compound selected from the group consisting of styrene and acrylonitrile containing a butyl ester of p-isopropyl benzoic acid.

14. As a new composition of matter, rubber-like copolymer of butadiene and a vinyl compound selected from the group consisting of styrene and acrylonitrile containing n-butyl ester of p-isopropyl benzoic acid.

15. A process of softening synthetic elastomers comprising treating rubber-like copolymers of butadiene and a vinyl compound selected from the group consisting of styrene and acrylonitrile with an aryl ester of p-isopropyl benzoic acid.

16. A process of softening synthetic elastomers comprising treating rubber-like copolymers of butadiene and a vinyl compound selected from the group consisting of styrene and acrylonitrile with a halogenated phenyl ester of p-isopropyl benzoic acid.

17. A process of softening synthetic elastomers comprising treating rubber-like copolymers of butadiene and a vinyl compound selected from the group consisting of styrene and acrylonitrile with 2,3,4,6-tetrachlorophenyl ester of p-isopropyl benzoic acid.

18. As a new composition of matter, rubber-like copolymer of butadiene and a vinyl compound selected from the group consisting of styrene and acrylonitrile containing an aryl ester of p-isopropyl benzoic acid.

19. As a new composition of matter, rubber-like copolymer of butadiene and a vinyl compound selected from the group consisting of styrene and acrylonitrile containing a halogenated phenyl ester of p-isopropyl benzoic acid.

20. As a new composition of matter, rubber-like copolymer of butadiene and a vinyl compound selected from the group consisting of styrene and acrylonitrile containing 2,3,4,6-tetrachlorophenyl ester of p-isopropyl benzoic acid.

21. A process of softening synthetic elastomers comprising treating rubber-like copolymers of butadiene and a vinyl compound selected from the group consisting of styrene and acrylonitrile with a cycloalkyl ester of p-isopropyl benzoic acid.

22. A process of softening synthetic elastomers comprising treating rubber-like copolymers of butadiene and a vinyl compound selected from the group consisting of styrene and acrylonitrile with cyclohexyl ester of p-isopropyl benzoic acid.

23. As a new composition of matter, rubber-like copolymer of butadiene and a vinyl compound selected from the group consisting of styrene and acrylonitrile containing a cycloalkyl ester of p-isopropyl benzoic acid.

24. As a new composition of matter, rubber-like copolymer of butadiene and a vinyl compound selected from the group consisting of styrene and acrylonitrile containing cyclohexyl ester of p-isopropyl benzoic acid.

LOWELL B. KILGORE.